United States Patent
Chen

(10) Patent No.: US 7,162,627 B2
(45) Date of Patent: Jan. 9, 2007

(54) METHOD OF SEQUENTIALLY SELECTING BOOTABLE MEMORY MODULE FOR BOOTING

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 369 days.

(21) Appl. No.: 10/900,121

(22) Filed: Jul. 28, 2004

(65) Prior Publication Data

US 2006/0026416 A1 Feb. 2, 2006

(51) Int. Cl.
*G06F 15/177* (2006.01)
*G06F 9/24* (2006.01)
*G06F 9/00* (2006.01)

(52) U.S. Cl. .............. 713/2; 713/1; 713/100
(58) Field of Classification Search ............... None
See application file for complete search history.

(56) References Cited

U.S. PATENT DOCUMENTS 6,535,992 B1 * 3/2003 Cheng ............... 714/5

FOREIGN PATENT DOCUMENTS

CN 1719411 A * 1/2006

* cited by examiner

*Primary Examiner*—Lynne H. Browne
*Assistant Examiner*—Stefan Stoynv
(74) *Attorney, Agent, or Firm*—Bacon & Thomas PLLC

(57) ABSTRACT

A method of sequentially selecting a bootable memory module for booting is disclosed, wherein memory modules are detected in sequence to choose usable memory modules before loading various parameters stored in a BIOS of a computer into the memory modules inserted into a memory module slot of a main board of the computer. The various parameters of the BIOS are then loaded into a first memory module of the usable memory modules. Thereafter, the parameters stored in the first memory module are compared with the original parameters of the BIOS to determine whether they are matched. If they are matched, a subsequent booting operation is then performed. If they are not matched, the comparing step is continuously performed in sequence until a bootable memory module is found.

6 Claims, 2 Drawing Sheets

METHOD OF SEQUENTIALLY SELECTING BOOTABLE MEMORY MODULE FOR BOOTING

BACKGROUND OF THE INVENTION

1. Field of the Invention

The present invention relates to a method of sequentially selecting a bootable memory module for booting, more particularly to a method able to automatically find out usable memory modules for booting and preventing a computer from unable to be booted.

2. Prior Art of the Invention

Dual In-line Memory Modules (called DIMM) and Single In-line Memory Modules (called SIMM) are small-scale circuit board with numerous memory chips. DIMM is in the forms of 72, 144, and 168 pins. The so-called "Dual" means that the right and left sides of the connecting finger receive different signals. DIMM includes Random Access Memory (RAM) chips mounted therein, that is, it is formed by coupling of two SIMMs. As the SIMM, the DIMM can be made in the form of single side or double sides. If one DIMM is mounted on a main board, it is not necessary to add another DIMM to form a pair. It can be paired randomly. For example, a DIMM with 64 mega bytes (called MB) can be inserted into a slot beside a DIMM with 32 MB. The difference between the DIMM and the SIMM is that the pins on both sides of the circuit board of the DIMM have independent circuits while circuits of the pins on both sides of the SIMM are connected. In other words, each of pins on both sides of the DIMM has its own specific definition for providing a broader access path to have a faster data transmission speed than that of the SIMM.

A DIMM with 168 pins, as such, has a 64 bits access path for its memory chip. If a BUS of the Central Processing Unit (called CPU) also has an access path with 64 bits, then an entire access operation will be performed on the memory for one time only. Therefore, one main board (or called mother board) needs merely one DIMM Moreover, the DIMM further includes an Erasable Programmable Read-Only Memory (called EPROM) to enable the Basic Input Output System (called BIOS) to store various parameters, which are used to adjust a chipset to a best status. The DIMM used in a high-level computer or a workstation mainly has 200 pins, and provided with 72 bits access BUS, wherein 64 bits are used for data and the remaining 8 bits are used for Error Checking and Correction Code (called ECC).

The BIOS is the most basic software in the booting operation for start-up of the computer, which has the basic parameters or programs burnt in a Flash ROM when the main board left the factory. That is, the most basic function of the BIOS is used to memorize the basic setting of the computer. At the same time, the users can use the BIOS to set the booting mode and the related parameters of every hardware of the computer. Generally, the BIOS will perform a Power On Self Test to confirm the basic configuration of every hardware of the computer while the computer is booting. For example, while the general computer is booting the BIOS will perform an access test on the memory for three times (if it was set to "enabled", then one times of access test will be performed to accelerate the booting speed). The various parameters stored therein are then loaded into the EPROM of the DIMM, thereby enabling the subsequently enabled software such as operation system to acquire the configuration setting of every hardware of the computer.

However, please refer to FIG. 1, for most computers the operation of loading various stored parameters into the memory modules will be performed according to the steps of:

(101) initializing memory modules n=0;

(102) reading the registered data of the nth memory module of the memory modules;

(103) determining if the nth memory module is existed. If yes, the step (110) is performed; if not, the following step (104) is performed;

(104) the number of n plus one;

(105) determining if the number of the nth is equal to or small than a maximum number the system can support; if yes, the step (102) is performed; if not, the following step (106) is performed;

(106) copying the parameters of the BIOS to the first memory module;

(107) comparing the parameters stored in the first memory module with the original parameters of the BIOS to determine that whether they are matched or not; if yes, the following step (108) is performed; if not, the step (109) is performed;

(108) performing a subsequent booting operation by using the parameters stored in the first memory module, then end;

(109) stopping the computer;

(110) setting the data of the nth memory module for a memory controller, and then performing the step (104).

As it can be seen that if the parameters stored in the first memory module are not complied with the original parameters of the BIOS, the first memory module cannot normally store the parameters of the BIOS. That is, the BIOS will not load any stored parameter into the memory modules, which will result in the computer cannot accomplish the booting procedure, the computer be shut down, the program can not continuously executed, and no frame and suggestive string are shown by the system. It is very inconvenient.

SUMMARY OF THE INVENTION

Whereas the aforementioned deficiencies in the conventional booting mode, that is, the computer cannot be booted when the first memory module is failed. The inventor has been made sustained researches, experiments, and improvements to finally develop "a method of sequentially selecting a bootable memory module for booting" of the present invention in accordance with inventor's experience accumulated in the skill of computers and servers manufacturing to cure the deficiencies derived from the prior art.

One aspect of the present invention is to provide a method of sequentially selecting a bootable memory module for booting to automatically find out the bootable memory module for preventing from the deficiency that the computer cannot be booted.

According to the above aspect of the present invention, a method of sequentially selecting a bootable memory module for booting is disclosed, in which memory modules are detected in sequence to choose usable memory modules before loading various parameters stored in a BIOS of a computer into the memory modules inserted into a memory module slot of a main board of the computer. The various parameters of the BIOS are then loaded into a first memory module of the usable memory modules. Thereafter, the parameters stored in the first memory module are compared with the original parameters of the BIOS to determine whether they are matched. If they are matched, a subsequent booting operation is then performed. If they are not matched, the first memory module is then labeled as a failed memory module and the failed memory module is discarded to load the parameters into a next first memory card and to perform a comparing step of the next first memory card. Thus, the comparing step is continuously performed in sequence until a bootable memory module is found. Accordingly, the computer cannot be booted only when entire memory modules that are used to boot the computer are failed. Consequentially, the circumstance of the conventional booting mode that the computer cannot be booted because of the failed memory module is prevented.

The above and other objects, features and advantages of the present invention will become apparent from the following detailed description taken with the accompanying drawings.

DETAILED DESCRIPTION OF THE PREFERRED EMBODIMENT

The present invention discloses a method of sequentially selecting a bootable memory module for booting, in which memory modules are detected in sequence to choose usable memory modules before loading various parameters stored in a BIOS of a computer, for example, a personal computer, a server, etc, into the memory modules inserted into a memory module slot of a main board of the computer. The various parameters of the BIOS are then loaded into a first memory module of the usable memory modules. Thereafter, the parameters stored in the first memory module are compared with the original parameters of the BIOS to determine whether they are matched or not. If they are matched, a subsequent booting operation is performed by using the parameters stored in the first memory module. If they are not matched, the first memory module is labeled as a failed memory module and the failed memory module is discarded to load the parameters into a next first memory card and to perform a comparing step of the next first memory card. Thus, the loading step and the comparing step are continuously performed in sequence until a bootable memory module is found. Accordingly, the computer cannot be booted only when entire memory modules that can be used to boot the computer are failed. Consequentially, the circumstance of the conventional booting mode that the computer cannot be booted because of the failed memory module is prevented.

In the present invention, when the computer is performing the subsequent booting operation, the BIOS can send a message related to the failed memory module to a control circuit mounted on the main board of the computer to enable a monitor of the computer to display a frame with an error message so that the frame can be observed by the user and used as a basis for repairing the computer.

In the present invention, the memory modules comprises at least one module such as 4 modules, wherein the computer uses "bit0" to stand for the first memory module (DIMM#1), "bit1" to stand for the second memory module (DIMM#2), and "bit(n−1)" to stand for the nth memory module (DIMM#n). A byte flag is used to indicate whether the memory modules are accessible or failed, wherein the accessible memory modules are indicated by setting the flag value to "0" and the failed memory modules are indicated by setting the flag value to "1". For example, the bit0 with a flag value equal to zero means that the first memory module is failed.

Figure 1:
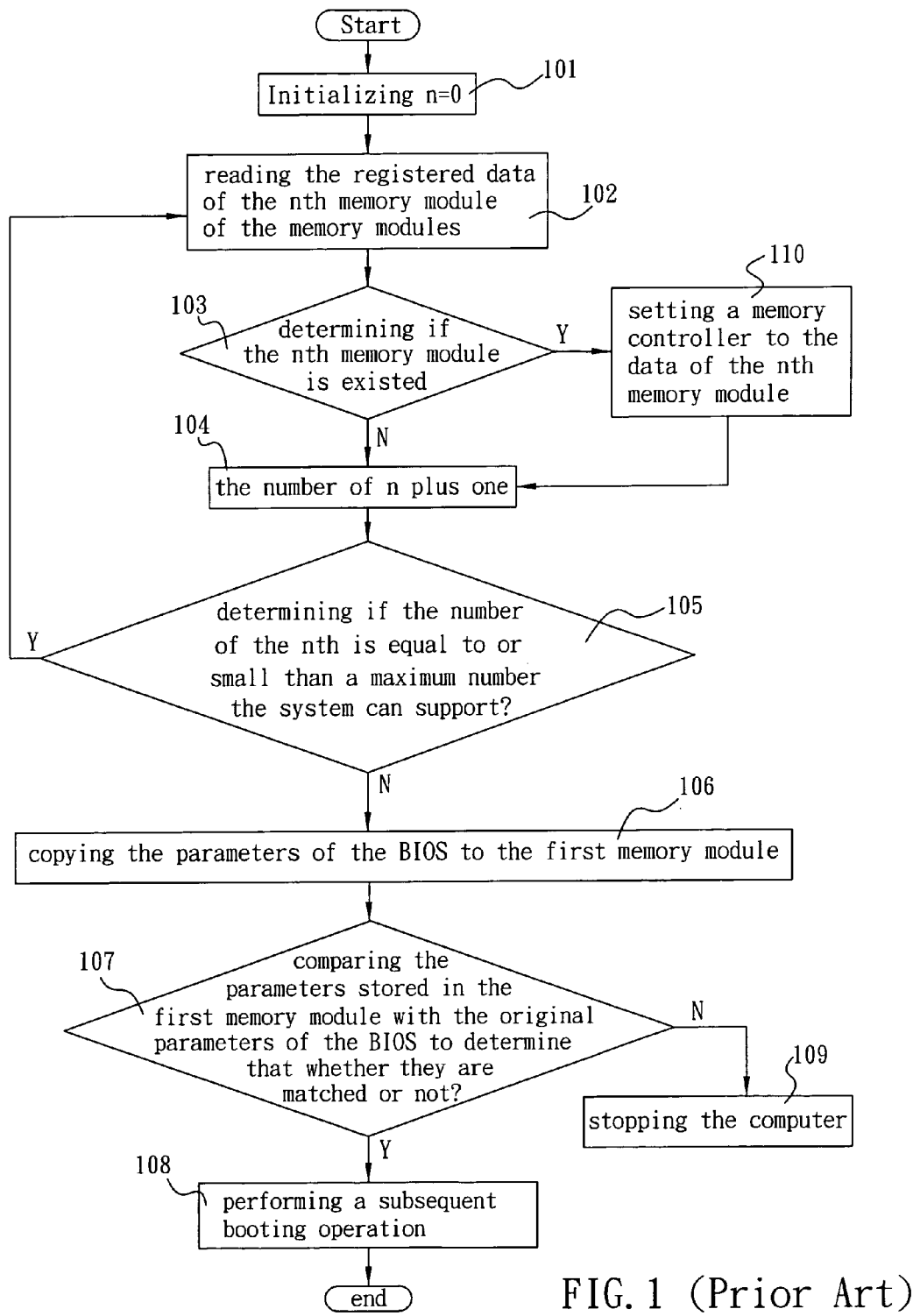
FIG. 1 is a diagram showing the operation process of the booting mode of the prior art.
Figure 2:
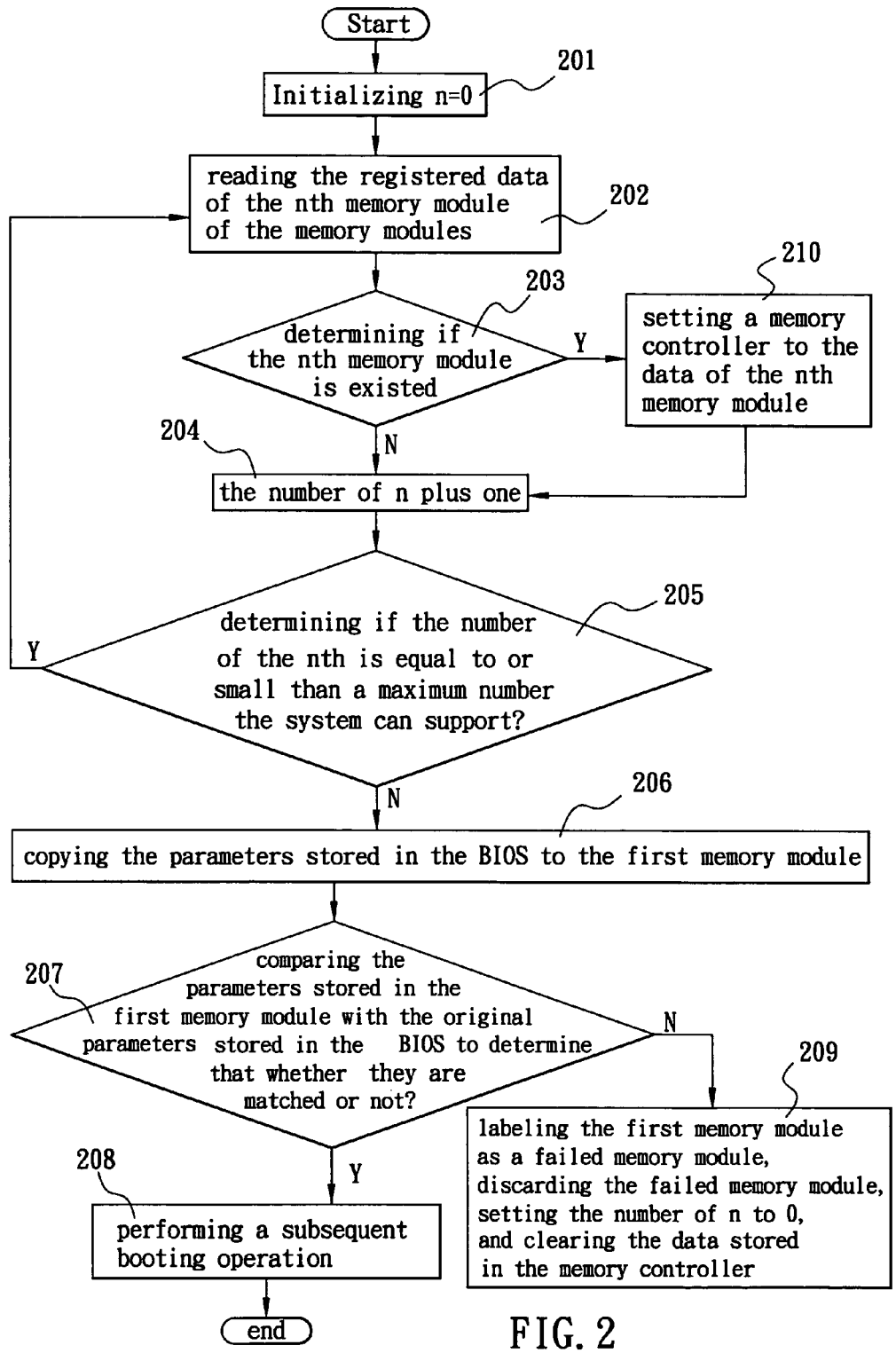
FIG. 2 is a diagram showing the operation process of the booting mode according to the present invention.

In one preferred embodiment of the present invention, as shown in FIG. 2, during the booting procedure of the computer the BIOS will perform the steps of:

(201) initializing memory modules n=0;

(202) reading the registered data of the nth memory module of the memory modules;

(203) determining if the nth memory module is existed; if it is existed, the step (210) is performed; if it is not existed, the step (204) is performed;

(204) the number of n plus one;

(205) determining if the number of the nth is equal to or small than a maximum number the system can support; if yes, then the step (202) is performed; if not, the following step (206) is performed;

(206) copying the parameters of the BIOS to the first memory module of the usable memory module;

(207) comparing the parameters stored in the first memory module with the original parameters of the BIOS to determine whether they are matched or not; if yes, the following step (208) is then performed; if not, the step (209) is then performed;

(208) labeling the first memory module as an accessible memory module (flag value=0), performing a subsequent booting operation by using the parameters stored in the first memory module, and then end;

(209) labeling the first memory module as a failed memory module (flag value=1), discarding the failed memory module to set the number of n to 0, and clearing the data in the memory controller, and then performing the step (202);

(210) setting the memory controller to the data of the nth memory module, then performing the step (204).

As described above, the present invention can automatically perform the comparing step on a plurality of memory modules of the computer to find out the bootable memory module, thereby enabling the subsequently loaded software such as operation system to acquire the configuration setting of every hardware of the computer. Consequentially, the circumstance of the conventional booting mode that the computer cannot be booted because of the failed memory module can be prevented. An error message indicated that one memory module cannot be accessed, namely, memory module is failed, can be showed on the monitor to provide the repairer with a basis for repairing the computer. Its convenience is incomparable.

While the invention has been described by means of specific embodiments, numerous modifications and variations could be made thereto by those skilled in the art without departing from the scope and spirit of the invention set forth in the claims.

What the invention claimed is:

1. A method of sequentially selecting a bootable memory module for booting, the method comprises steps:

detecting memory modules in sequence to choose usable memory modules before loading various parameters stored in a BIOS of a computer into the memory modules inserted into a memory module slot of a main board of the computer;

loading the various parameters of the BIOS into a first memory module of the usable memory modules;

comparing the parameters stored in the first memory module with the original parameters of the BIOS to determine whether they are matched or not, performing a subsequent booting operation by using the parameters stored in the first memory module if they are matched; labeling the first memory module as a failed memory module and discarding the failed memory module to load the parameters into a next first memory card and to perform a comparing step of the next first memory card if they are not matched, wherein the comparing step is continuously performed in sequence until a bootable memory module is found.

2. The method of sequentially selecting the bootable memory module for booting of claim 1, wherein while the computer is performing the subsequent booting operation, the BIOS can send a message related to the failed memory module to a control circuit mounted on the main board of the computer to enable a monitor of the computer to display a frame with an error message so that the frame can be observed and used as a basis for repairing the computer.

3. The method of sequentially selecting the bootable memory module for booting of claim 1, wherein the memory modules are Dual In-line Memory Modules. (DIMM).

4. The method of sequentially selecting the bootable memory module for booting of claim 1, wherein the computer is a personal computer.

5. The method of sequentially selecting the bootable memory module for booting of claim 1, wherein the computer is a server.

6. The method of sequentially selecting the bootable memory module for booting of claim 1, wherein the memory modules comprises at least one module, the computer uses "bit0" to stand for the first memory module (DIMM#1), "bit1" to stand for the second memory module (DIMM#2), and "bit(n−1)" to stand for the nth memory module (DIMM#n), and a byte flag is used to record whether the memory modules are accessible or failed, wherein the accessible memory modules are indicated by setting the flag value to "0" and the failed memory modules are indicated by setting the flag value to "1".

* * * * *